United States Patent
Ismael et al.

(10) Patent No.: US 10,592,678 B1
(45) Date of Patent: Mar. 17, 2020

(54) SECURE COMMUNICATIONS BETWEEN PEERS USING A VERIFIED VIRTUAL TRUSTED PLATFORM MODULE

(71) Applicant: FireEye, Inc., Milpitas, CA (US)

(72) Inventors: Osman Abdoul Ismael, Palo Alto, CA (US); Hendrik Tews, Dresden (DE)

(73) Assignee: FireEye, Inc., Milpitas, CA (US)

( * ) Notice: Subject to any disclaimer, the term of this patent is extended or adjusted under 35 U.S.C. 154(b) by 137 days.

(21) Appl. No.: 15/261,104

(22) Filed: Sep. 9, 2016

(51) Int. Cl.
*H04L 9/08* (2006.01)
*H04L 29/06* (2006.01)
*G06F 21/62* (2013.01)

(52) U.S. Cl.
CPC ............ *G06F 21/62* (2013.01); *H04L 9/0861* (2013.01); *H04L 63/0428* (2013.01)

(58) Field of Classification Search
CPC .......... G06F 21/62; G06F 21/57; G06F 21/50; G06F 21/53; H04L 9/0861
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

A Software-Based Trusted Platform Module Emulator, Mario Strasser et al. (Year: 2008).*

(Continued)

*Primary Examiner* — Alexander Lagor
*Assistant Examiner* — Wu V Tran
(74) *Attorney, Agent, or Firm* — Rutan & Tucker, LLP

(57) ABSTRACT

The embodiments herein are directed to a technique for providing secure communication between nodes of a network environment or within a node of the network using a verified virtual trusted platform module (TPM) of each node. The verified virtual TPM illustratively emulates a hardware TPM device to provide software key management of cryptographic keys used to provide the secure communication over a computer network of the network environment. Illustratively, the verified virtual TPM is configured to enforce a security policy of a trusted code base (TCB) that includes the virtual TPM. Trustedness denotes a predetermined level of confidence that the security property is demonstrated by the verified virtual TPM. The predetermined level of confidence is based on an assurance (i.e., grounds) that the verified virtual TPM demonstrates the security property. Trustedness of the virtual TPM may be verified by subjecting the virtual TPM to enhanced verification analysis configured to ensure conformance to an operational model with an appropriate level of confidence over an appropriate range of activity. The operational model may then be configured to analyze conformance to the security property. A combination of conformance by the virtual TPM to the operational model and to the security property provides assurance (i.e., grounds) for the level of confidence and, thus, verifies trustedness.

31 Claims, 7 Drawing Sheets

(56) References Cited

U.S. PATENT DOCUMENTS

| | | |
|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowland |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,146,605 B2 | 12/2006 | Beer et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,244,516 B2 | 8/2012 | Arbel et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,347,288 B1 | 1/2013 | Brandwine |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |

(56) References Cited

U.S. PATENT DOCUMENTS

| | | |
|---|---|---|
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shifter et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Osman et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |

(56) References Cited

U.S. PATENT DOCUMENTS

| | | |
|---|---|---|
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0019941 A1 | 2/2002 | Chan et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0097578 A1* | 5/2003 | England ............ G06F 21/57 713/191 |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0251853 A1* | 11/2005 | Bhargavan ............ H04L 63/08 726/1 |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van De Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006306 A1* | 1/2007 | Seifert ............ G06F 21/554 726/22 |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |

(56) References Cited

U.S. PATENT DOCUMENTS

| | | |
|---|---|---|
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0244569 A1 | 10/2008 | Challener et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0086979 A1 * | 4/2009 | Brutch ............... H04L 9/0836 380/279 |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0153924 A1 | 6/2010 | Andrews |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0258607 A1 | 10/2011 | Bhatt et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |

(56) References Cited

U.S. PATENT DOCUMENTS

| | | |
|---|---|---|
| 2011/0314546 A1 | 12/2011 | Aziz et al. |
| 2012/0023593 A1 | 1/2012 | Puder |
| 2012/0054869 A1 | 3/2012 | Yen et al. |
| 2012/0066698 A1 | 3/2012 | Yanoo |
| 2012/0079596 A1 | 3/2012 | Thomas |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0198514 A1 | 8/2012 | McCune et al. |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallarn |
| 2012/0260342 A1 | 10/2012 | Dube et al. |
| 2012/0260345 A1 | 10/2012 | Quinn et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0006776 A1* | 1/2014 | Scott-Nash ............ G06F 21/57 713/156 |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0075522 A1 | 3/2014 | Paris et al. |
| 2014/0130158 A1* | 5/2014 | Wang ................... G06F 21/566 726/23 |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Osman et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 02/006928 A2 | 1/2002 |
| WO | 02/23805 A2 | 3/2002 |
| WO | 2007117636 A2 | 10/2007 |
| WO | 2008/041950 A2 | 4/2008 |
| WO | WO-2009095741 A1 | 8/2009 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

TPM: Virtualizing the Trusted Platform Module, Stefan et al. (Year: 2006).*

Brucker, et al., On theorem prover-based testing, Formal Aspects of Computing, 25.5 (2013), pp. 683-721.

Common Criteria for Information Technology Security Evaluation, Part 3: Security assurance components Version 3.1, Revision 4, CCMB-2012,- Sep. 2012, 233 pages.

Crocker, et al., Verification of C programs using automated reasoning, Software Engineering and Formal Methods, 2007. SEFM 2007. Fifth IEEE International Conference on. IEEE, 2007, pp. 7-14.

Del Grosso et al., An evolutionary testing approach to detect buffer overflow, Student Paper Proceedings of the International Symposium of Software Reliability Engineering (ISSRE), St. Mato, France, 2004, 2 pages.

Dybjer, et al., Verifying Haskell programs by combining testing and proving, Quality Software, 2003. Proceedings. Third international Conference, IEEE, 2003, 8 pages.

Fernandez, et al. "Towards a verified component platform," *Proceedings of the Seventh Workshop on Programming Languages and Operating Systems*. ACM, 2013, 7 pages.

Fernandez, et al. "CAmkES glue code semantics." Apr. 2013, 45 pages.

(56) References Cited

OTHER PUBLICATIONS

Garfinkel, et al. "Terra: A virtual machine-based platform for trusted computing." ACM SIGPOPS '03. ACM, Oct. 2003, 14 pages.

Gebhardt, Carl. "Towards Trustworthy Virtualisation: Improving the Trusted Virtual Infrastructure." Technical Report RHUL-MA-2011-10, Mar. 17, 214 pages.

Gollmann, Dieter. "Why trust is bad for security." *Electronic notes in theoretical computer science* 157.3,2006, pp. 3-9.

Hepburn, et al. "Execution Contexts for Determining Trust in a Higher-Order pi-Calculus." School of Computing, University of Tasmania Technical Report R-01-2003, 2003, 36 pages.

Hudak, Paul, "Conception, evolution, and application of functional programming languages." ACM Computing Surveys (CSUR) 21.3 (1989): 359-411.

Klein, et al. "seL4: Formal verification of an OS kernel." *Proceedings of the ACM SIGPOPS 22nd symposium on Operating systems principles.* ACM, 2009, pp. 207-220.

Latham, Donald C. "Department of Defense Trusted Computer System Evaluation Criteria." *Department of Defense* (1986), 116 pages.

Marsh, Stephen. "Formalising trust as a computational concept," *Ph.D. dissertation. University of Stirling, Scotland*(1994), 184 pages.

McCune, et al. "Flicker: An execution infrastructure for TCB minimization." *ACM SIGPOPS Operating Systems Review*, vol. 42. No. 4. ACM, 2008, 14 pages.

McCune, et al. "TrustVisor: Efficient TCB reduction and attestation." *CyLab, Carnegie Mellon University, CMU-CyLab-09-003*, Mar. 9, 2009 (revised Mar. 10, 2010), 17 pages.

Mohammad, et al. "A formal approach for the specification and verification of trustworthy component-based systems." *ACTS Research Group, ACTS Report Series*, May 2009, 73 pages.

Mohammad et al. "A component-based development process for trustworthy systems." *ACTS Research Group, Acts Report Series*, Sep. 2009, 48 pages.

Parker, Timothy. *Protecting Cryptographic Keys and Functions from Malware Attacks.* Diss, Texas Univ at San Antonio Dept of Computer Science, 2010, 116 pages.

Parno, Bryan, Thesis—"Trust extension as a mechanism for secure code execution on commodity computers." 2010, 203 pages.

PCT Notification of Transmittal of the International Search Report and the Written Opinion of the International Searching Authority, or the Declaration, International Searching Authority, Internationai Application No. PCT/US2015/038616, dated Sep. 16, 2015, 9 pages.

Popovic et al., An approach to formal verification of embedded software, Proc. of 15th WSEAS Int. Conf. on Computers, 2011, pp. 29-34.

Rushby, John, Software verification and system assurance, Software Engineering and Formal Methods, 2009 Seventh IEEE International Conference, IEEE, 2009, pp. 3-10.

Santos, et al. "Trusted language runtime (TLR): enabling trusted applications on smartphones." *Proceedings of the 12th Workshop on Mobile Computing Systems and Applications.* ACM, 2011, 6 pages.

Santos, Nuno, et al. "Using ARM trustzone to build a trusted language runtime for mobile applications." *Proceedings of the 19th international conference on Architectural support for programming languages and operating systems.* ACM, 2014, 14 pages.

Sewell, et al. "Translation validation for a verified OS kernel." *ACM SIGPLAN Notices* 48.6, 2013, 11 pages.

Stumpf, et al. "An approach to a trustworthy system architecture using virtualization." *Autonomic and trusted computing.* Springer Berlin Heidelberg, 2007, pp. 191-202.

Tews, Hendrik. "Micro hypervisor verification: Possible approaches and relevant properties." *NLUUG Voorjaarsconferentie*, Apr. 2007, 14 pages.

Trusted Platform Module Library, Family 2.0, Revision 01.16, (http://www.trustedcomputinggroup.org), also published at International Standards Organization as ISO/IEC 11889-1:2015.

Wikipedia—"Haskell (programming language)" description, printed Oct. 4, 2013. 11 pages.

Wikipedia—"Hoare logic" description, printed Oct. 4, 2013, 7 pages.

"Mining Specification of Malicious Behavior"—Jha et al, UCSB, Sep. 2007 https://www.cs.ucsb.edu/.about.chris/research/doc/esec07.sub.--mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexploreieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10:1109/MSP.2011.14.

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

(56) References Cited

OTHER PUBLICATIONS

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A. et al., ""Analyzing and exploiting network behaviors of malware."", Security and Privacy in communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

Venezia, Paul, "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

US 10,592,678 B1

SECURE COMMUNICATIONS BETWEEN PEERS USING A VERIFIED VIRTUAL TRUSTED PLATFORM MODULE

BACKGROUND

Technical Field

The disclosure herein relates to virtualization systems and, more specifically, to a verified virtual trusted platform module (TPM) of a virtualization system.

Background Information

Communication in a network involves the exchange of information between two or more entities interconnected by communication links and sub-networks (segments). The entities are typically software processes executing in operating systems of computers, such as endpoint nodes (endpoints) and/or intermediate nodes. The intermediate nodes interconnect the communication links and segments to enable transmission of data between the endpoints. A local area network (LAN) is an example of segment that provides relatively short distance communication among the interconnected nodes, whereas a wide area network (WAN) enables long distance communication over links provided by telecommunications facilities. The Internet is an example of a WAN that connects disparate computer networks throughout the world, providing global communication between nodes on various networks.

Often, it is desirable to exchange information securely between the nodes over the network. Secure communication may be established in accordance with a cryptographic network protocol using cryptographic keys. Specifically, the secure communication may be established in a manner that ensures that the cryptographic keys are dispatched (managed) properly to the nodes, i.e., in a secure manner. Secure management of cryptographic keys may be implemented through use of verifiably secure hardware devices, such as a trusted platform module (TPM), which is configured to prevent access (e.g., read access) to the keys. However, a TPM hardware device may not always be available on the nodes; yet software only key management for cryptographic keys is not generally considered a verifiably secure approach. Accordingly, it is desirable to provide verifiable secure software key management for cryptographic keys used to establish secure communication between nodes of a network.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
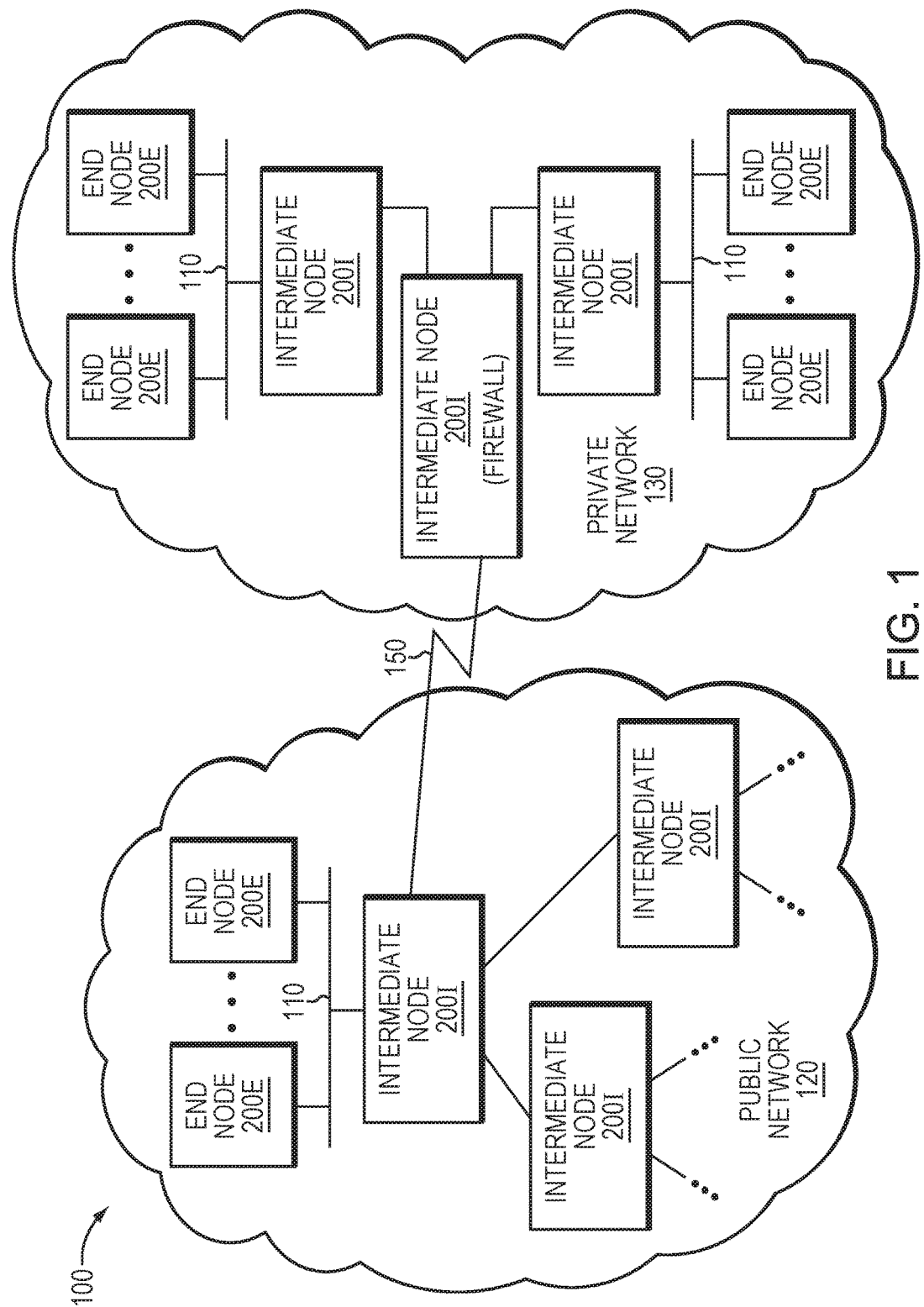
FIG. 1 is a block diagram of a network environment that may be advantageously used with one or more embodiments described herein.

The embodiments herein are directed to a technique for providing secure communication between nodes of a network environment or within a node of the network using a verified virtual trusted platform module (TPM) of each node. The verified virtual TPM illustratively emulates a hardware TPM device to provide software key management of cryptographic keys used to provide the secure communication over a computer network of the network environment. To that end, the technique provides a "core" virtual TPM interface to enable access to software key management services relating to generation and storage of the cryptographic keys. The software key management services may be accessed to perform encryption and/or decryption of information, as well as signature and/or verification of the information exchanged over the network (or within the node) with a user (peer). The peer may access the services provided by the core virtual TPM interface through the use of function calls embodied as application programming interfaces (APIs) that comply with the hardware TPM device.

In an embodiment, the verified virtual TPM is a module of a trusted code base (TCB) that includes a micro-hypervisor and root task module of a virtualization system configured to facilitate run-time security analysis, including exploit and malware detection as well as threat intelligence collection, associated with one or more processes of a guest operating system executing on the node. As a trusted module of the TCB, the verified virtual TPM is configured to enforce a security policy of the TCB that, e.g., prevents alteration of a state related to security of the verified virtual TPM by a module (e.g., software entity) of or external to an environment in which the verified virtual TPM operates, i.e., the TCB. For example, an exemplary security policy may provide, "modules of the TCB shall be immutable," which may be implemented as a security property of the verified virtual TPM, an example of which is no module external to the verified virtual TPM can read the contents of secure memory for the verified virtual TPM.

Illustratively, the verified virtual TPM may manifest (i.e., demonstrate) the security property in a manner that enforces the security policy. Accordingly, verification of the virtual TPM to demonstrate the security property necessarily enforces the security policy, i.e., the virtual TPM may be trusted by demonstrating the security property and thereby transform that module into a verified virtual TPM. As used herein, trusted (or trustedness) denotes a predetermined level of confidence that the security property is demonstrated by the verified virtual TPM. The predetermined level of confidence, in turn, is based on an assurance (i.e., grounds) that the verified virtual TPM demonstrates the security property. Therefore, manifestation denotes a demonstrated implementation that assurance is provided regarding the implementation based on an evaluation assurance level, i.e., the more extensive the evaluation, the greater the assurance level.

In an embodiment, trustedness of the virtual TPM may be verified by subjecting the TCB (i.e., virtual TPM) to enhanced verification analysis prior to deployment on the node so as to transform that virtual TPM into a verified virtual TPM. Enhanced verification may be configured to ensure that the TCB conforms to an operational model with an appropriate level of confidence over an appropriate range of activity (e.g., inputs, outputs, and operational states). The operational model may then be configured to analyze conformance of the virtual TPM to the security property, i.e., to determine whether the virtual TPM demonstrates the security property. A combination of conformance by the virtual TPM to the operational model and to the security property provides assurance (i.e., grounds) for the level of confidence and, thus, verifies trustedness to yield a verified virtual TPM. For example, trustedness (i.e., a predetermined level of confidence in manifestation of the security property) of the verified virtual TPM may be verified (i.e., confidence elevated) by demonstrating that an instruction issued by a module external to the TCB and having one or more arguments configured to alter an expected behavior or state of the verified virtual TPM related to the security property results in a violation (i.e., generation of a capability violation) such that the instruction is rejected (reply with error code) or ignored and prevented from execution by the micro-hypervisor.

DESCRIPTION

FIG. 1 is a block diagram of a network environment 100 that may be advantageously used with one or more embodiments described herein. The network environment 100 illustratively includes a plurality of computer networks organized as a public network 120, such as the Internet, and a private network 130, such an organization or enterprise network. The networks 120, 130 illustratively include a plurality of network links and segments connected to a plurality of nodes 200. The network links and segments may embody local area networks (LANs) 110 and wide area networks (WANs) 150, including wireless networks, interconnected by intermediate nodes $200_I$, such as network switches or routers, to form an internetwork of nodes. The LANs 110 may, in turn, interconnect end nodes $200_E$ embodied as endpoints. In an embodiment, the endpoints may illustratively include, e.g., client/server desktop computers, laptop/notebook computers, process controllers, medical devices, data acquisition devices, mobile devices, such as smartphones and tablet computers, and/or any other intelligent electronic device having network connectivity that may be configured to implement a virtualization system. The nodes 200 illustratively communicate by exchanging packets or messages (i.e., network traffic) according to a predefined set of protocols, such as the Transmission Control Protocol/Internet Protocol (TCP/IP); however, it should be noted that other protocols, such as the HyperText Transfer Protocol Secure (HTTPS), may be advantageously used with the embodiments herein. In the case of private network 130, the intermediate node $200_I$ may include a firewall or other network device configured to limit or block certain communication (network) traffic in an attempt to protect the endpoints from unauthorized users. Unfortunately, such conventional attempts often fail to protect the endpoints, which may be compromised.

Figure 2:
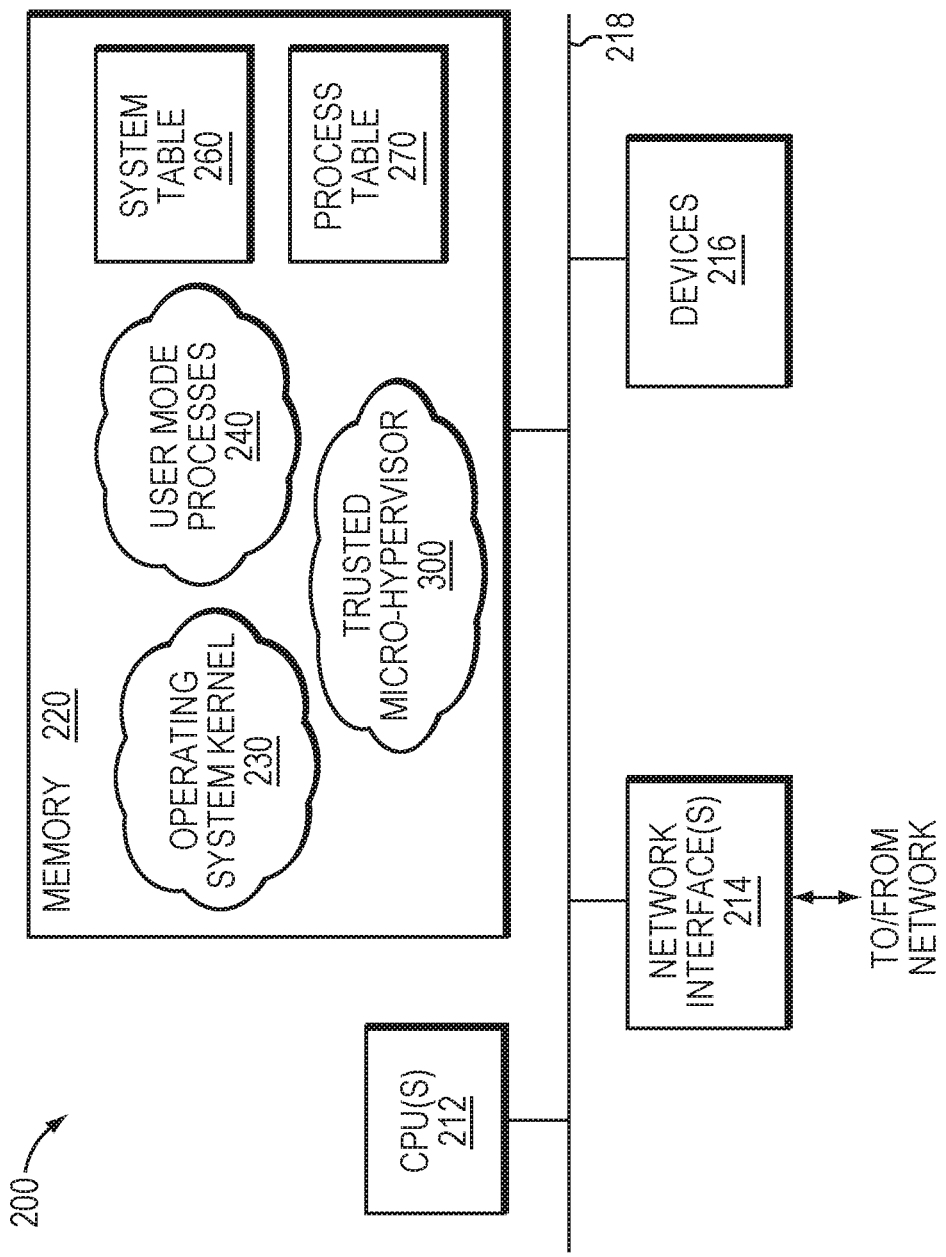
FIG. 2 is a block diagram of a node that may be advantageously used with one or more embodiments described herein.

FIG. 2 is a block diagram of a node 200, e.g., an end node $200_E$ or intermediate node $200_I$, that may be advantageously used with one or more embodiments described herein. The node 200 illustratively includes one or more central processing unit (CPUs) 212, a memory 220, one or more network interfaces 214 and one or more devices 216 connected by a system interconnect 218, such as a bus. The devices 216 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 214 may contain the mechanical, electrical and signaling circuitry needed to connect the node to the network 120, 130 thereby to facilitate communication over the network. To that end, the network interface 214 may be configured to transmit and/or receive messages using a variety of communication protocols including, inter alia, TCP/IP and HTTPS.

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code, such as trusted threat-aware micro-hypervisor 300, and manipulate the data structures, such as system table 260 and process table 270. Exemplary CPUs may include families of instruction set architectures based on the x86 CPU and the x64 CPU.

An operating system kernel 230, portions of which are typically resident in memory 220 and executed by the CPU, functionally organizes the node by, inter alia, invoking operations in support of the software program code and application programs executing on the node. A suitable operating system kernel 230 may include proprietary and open source operating systems from a variety of commercial vendors or available publicly. Suitable application programs may include internet browsers, document viewers or browsers, word processors, email clients and the like as known to persons of skill in the art. Illustratively, the software program code (including the application programs) may be implemented as operating system processes (including user mode processes 240) of the kernel 230. As used herein, a process (e.g., a user mode process) is an instance of software program code (e.g., an application program) executing in the operating system that may be separated (decomposed) into one or more of threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer, e.g., application programs stored in memory, alternative embodiments also include the code/processes/programs being embodied as modules consisting of hardware, software, firmware, or combinations thereof.

Trusted Threat-Aware Micro-Hypervisor

Figure 3:
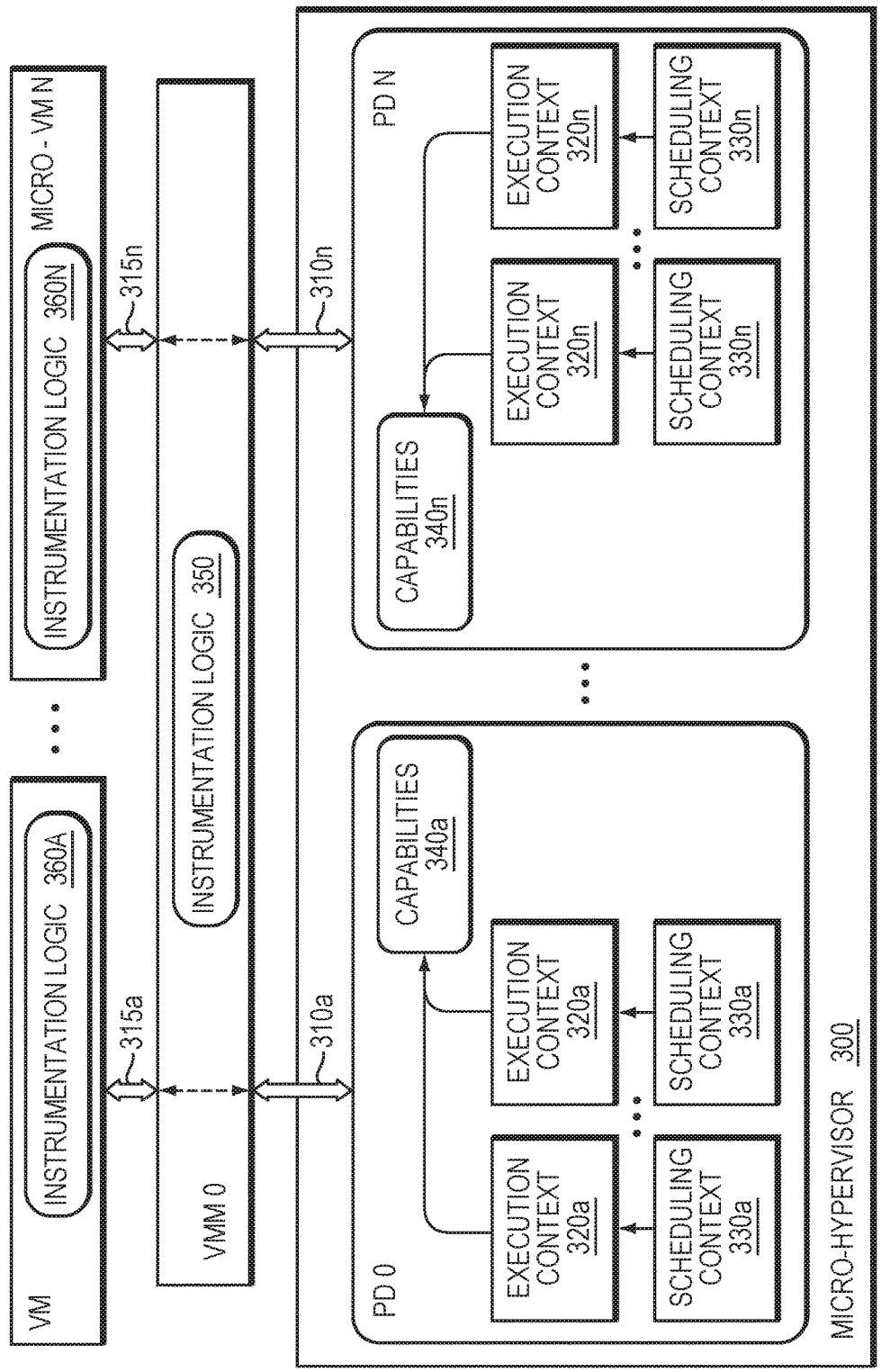
FIG. 3 is a block diagram of a trusted, threat-aware micro-hypervisor that may be advantageously used with one or more embodiments described herein.

The embodiments herein provide a trusted, threat-aware micro-hypervisor that may be deployed in a virtualization system configured to facilitate run-time security analysis, including exploit and malware detection as well as threat intelligence collection, associated with one or more operating system processes executing on the node 200 of the network environment 100. FIG. 3 is a block diagram of the trusted, threat-aware micro-hypervisor 300 that may be advantageously used with one or more embodiments described herein. The trusted threat-aware micro-hypervisor (hereinafter "micro-hypervisor") may be embodied as a light-weight module disposed or layered beneath (underlying, i.e., directly on native hardware) the operating system kernel 230 executing on the node to virtualize the hardware and control privileges (i.e., access control permissions or capabilities) to kernel (e.g., hardware) resources of the node 200 that are typically controlled by the operating system kernel. That is, the micro-hypervisor may be implemented in an operationally efficient (i.e., light-weight or reduced kernel resource footprint) manner that maintains user experience (i.e., little performance degradation) at the node. Illustratively, the kernel resources may include (physical) CPU(s) 212, memory 220, network interface(s) 214 and devices 216. The micro-hypervisor may be configured to control access to one or more of the resources in response to a request by an operating system process to access the resource.

As a light-weight module, the micro-hypervisor may provide a virtualization layer having less functionality than a typical hypervisor. Accordingly, the micro-hypervisor may cooperate with a unique virtual machine monitor (VMM), i.e., a type 0 VMM, to provide additional virtualization functionality in an operationally and resource efficient manner. Unlike a type 1 or type 2 VMM (hypervisor), the type 0 VMM (VMM 0) does not fully virtualize the kernel (hardware) resources of the node and supports execution of only one entire operating system/instance inside one virtual machine, i.e., VM. VMM 0 may thus instantiate the VM as a container for the operating system kernel 230 and its kernel resources. In an embodiment, VMM 0 may instantiate the VM as a module having instrumentation logic 360A directed to determination of an exploit and malware in any suspicious operating system process (kernel or user mode). Illustratively, VMM 0 is a pass-through module configured to expose the kernel resources of the node (as controlled by micro-hypervisor 300) to the operating system kernel 230. VMM 0 may also expose resources such as virtual CPUs (threads), wherein there is one-to-one mapping between the number of physical CPUs and the number of virtual CPUs that VMM 0 exposes to the operating system kernel 230. To that end, VMM 0 may enable communication between the operating system kernel (i.e., the VM) and the micro-hypervisor over privileged interfaces 315a and 310a.

The VMM 0 may include software program code (e.g., executable machine code) in the form of instrumentation logic 350 (including decision logic) configured to analyze one or more interception points originated by one or more operating system processes to invoke the services, e.g., accesses to the kernel resources, of the operating system kernel 230. As used herein, an interception point is a point in an instruction stream where control passes to (e.g., is intercepted by) either the micro-hypervisor, VMM 0 or another virtual machine. An interception point may thus include, inter alia, a memory access request, a function call or a system call. For example in response to an interception point, VMM 0 may assume control over the operating system kernel 230 to enable monitoring of activity (including examination of a state) of the process to determine its suspiciousness and to enable detection of exploits or other potentially malicious behavior of malware. Suspiciousness may thus denote anomalous behavior of a process or its interception point (e.g., system call) that is not expected during run-time and, therefore, may indicate a certain probability of being an exploit or malware. Illustratively, the instrumentation logic 350 may include a classifier (not shown) that determines whether a process is suspicious (and categorize the activity) using pre-defined anomalous behaviors (monitored activity) of verified exploits and malware. Examples of a threat-aware micro-hypervisor, a VMM 0 and a micro-virtual machine are described in U.S. patent application Ser. No. 14/229,533 titled Threat-Aware Microvisor by Osman et al., filed Mar. 28, 2014.

An exploit may be construed as information (e.g., executable code, data, one or more commands provided by a user or attacker) that attempts to take advantage of a computer program or system vulnerability, often employing malware. Typically, a vulnerability may be a coding error or artifact of a computer program that allows an attacker to alter legitimate control flow during processing of the computer program by an electronic device and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed by an exploit to harm or co-opt operation of an electronic device or misappropriate, modify or delete data. Conventionally, malware may often be designed with malicious intent, and may be used to facilitate an exploit. For convenience, the term "malware" may be used herein to describe a malicious attack, and encompass both malicious code and exploits detectable in accordance with the disclosure herein.

As described herein, a system call provides an interception point at which a switch in privilege levels occurs in the operating system, i.e., from a privilege level of the user mode process to a privilege level of the operating system kernel. VMM 0 may intercept the system call and examine a state of the process issuing (sending) the call. The instrumentation logic 350 of VMM 0 may analyze the system call to determine whether the call is suspicious and, if so, instantiate (spawn) one or more "micro" virtual machines (VMs) equipped with monitoring functions that cooperate with the micro-hypervisor to detect anomalous behavior which may be used in determining an exploit. As used herein, the term "micro" VM denotes a virtual machine serving as a container that is restricted to a process (as opposed to the VM which is spawned as a container for the entire operating system). Such spawning of a micro-VM may result in creation of an instance of another module (i.e., micro-VM AO that is substantially similar to the VM, but with different (e.g., additional) instrumentation logic 360N illustratively directed to determination of an exploit or malware in the suspicious process by, e.g., monitoring its behavior.

In an embodiment, the spawned micro-VM illustratively encapsulates an operating system process, such as user mode process 240. The process may include one or more threads that may be encapsulated by the spawned micro-VM. In another embodiment, two or more related processes (e.g., sharing a user mode resource, such as memory) may be encapsulated by the micro-VM. In terms of execution, operation of the process is controlled and synchronized by the operating system kernel 230; however, in terms of access to kernel resources, operation of the encapsulated process is controlled by VMM 0. Notably, the resources appear to be isolated within each spawned micro-VM such that each respective encapsulated process appears to have exclusive control of the resources. In other words, access to kernel resources is synchronized among the micro-VMs and VM by VMM 0 rather than virtually shared. Accordingly, VMM 0 may contain computer executable instructions executed by the CPU 212 to perform operations that initialize and implement the instrumentation logic 350, as well as operations that spawn, configure and control the VM and any of a plurality of micro-VMs (including instrumentation logic 360A-N). Similar to the VM, each micro-VM may be configured to communicate with the micro-hypervisor (via VMM 0) over privileged interfaces 315n and 310n. Notably, the privileged interfaces 310a-n and 315a-n may be embodied as a set of defined hyper-calls, as described further herein.

In an embodiment, the micro-hypervisor 300 may be organized to include a plurality of protection domains (e.g., PD 0-N) illustratively bound to the VM and one or more micro-VMs, respectively. As used herein, a protection domain is a container for various data structures, such as execution contexts, scheduling contexts, and capabilities associated with the kernel resources accessible by an operating system process. Illustratively, the protection domain may function at a granularity of an operating system process (e.g., a user mode process 240) and, thus, is a representation of the process. Accordingly, the micro-hypervisor may provide a protection domain for the process and its run-time threads executing in the operating system. The main protection domain (PD0) of the micro-hypervisor controls all of the kernel resources available to the operating system kernel 230 (and, hence, the user mode process 240) of the VM via VMM 0 and, to that end, may be associated with the services provided to the user mode process by the kernel 230, such as information in the process table 270. The spawned micro-VM (e.g., micro-VM N) is illustratively associated with (bound to) a copy of PD 0 (e.g., PD N) which, in turn, may be bound to the process, wherein such binding may occur through memory context switching.

As used herein, an execution context 320 is illustratively a representation of a thread (associated with an operating system process) and, to that end, defines a state of the thread for execution on CPU 212. In an embodiment, the execution context may include inter alia (i) contents of CPU registers, (ii) pointers/values on a stack, (iii) a program counter, and/or (iv) allocation of memory via, e.g., memory pages. The execution context 320 is thus a static view of the state of thread and, therefore, its associated process. Accordingly, the thread executes within the protection domain associated with the operating system process of which the thread is a part. For the thread to execute on a CPU 212 (e.g., as a virtual CPU), its execution context 320 is tightly linked to a scheduling context 330, which may be configured to provide information for scheduling the execution context 320 for execution on the CPU 212. Illustratively, the scheduling context information may include a priority and a quantum time for execution of its linked execution context on CPU 212.

In an embodiment, the capabilities 340 may be organized as a set of access control permissions to the kernel resources to which the thread may request access. Each time the execution context 320 of a thread requests access to a kernel resource, the capabilities 340 are examined. There is illustratively one set of capabilities 340 for each protection domain, such that access to kernel resources by each execution context 320 (i.e., each thread of an execution context) of a protection domain may be defined by the set of capabilities 340. For example, physical addresses of pages of memory 220 (resulting from mappings of virtual addresses to physical addresses) may have associated access permissions (e.g., read, write, read-write) within the protection domain. To enable an execution context 320 to access a kernel resource, such as a memory page, the physical address of the page may have a capability 340 that defines how the execution context 320 may reference that page. Illustratively, the capabilities may be examined by hardware (e.g., a hardware page fault upon a memory access violation) or by program code. As described herein, violation of a capability in a protection domain may be an interception point, which returns control to the VM (e.g., VM or micro-VM N) bound to the protection domain.

Advantageously, the micro-hypervisor 300 may be organized as separate protection domain containers for the operating system kernel 230 (PD 0) and one or more operating system processes (PD N) to facilitate further monitoring and understanding of behaviors of the process and its threads. Such organization of the micro-hypervisor also enforces separation between the protection domains to control the activity of the monitored process. Moreover, the micro-hypervisor 300 may enforce access to the kernel resources through the use of variously configured capabilities 340 of the separate protection domains. Unlike previous virtualization systems, separation of the protection domains to control access to kernel resources at a process granularity enables detection of anomalous behavior of an exploit. That is, in addition to enforcing access to kernel resources, the micro-hypervisor enables analysis of the operation of a process within a spawned micro-VM to detect exploits or other malicious code threats that may constitute malware.

Trusted Computing Base (TCB)

Figure 4:
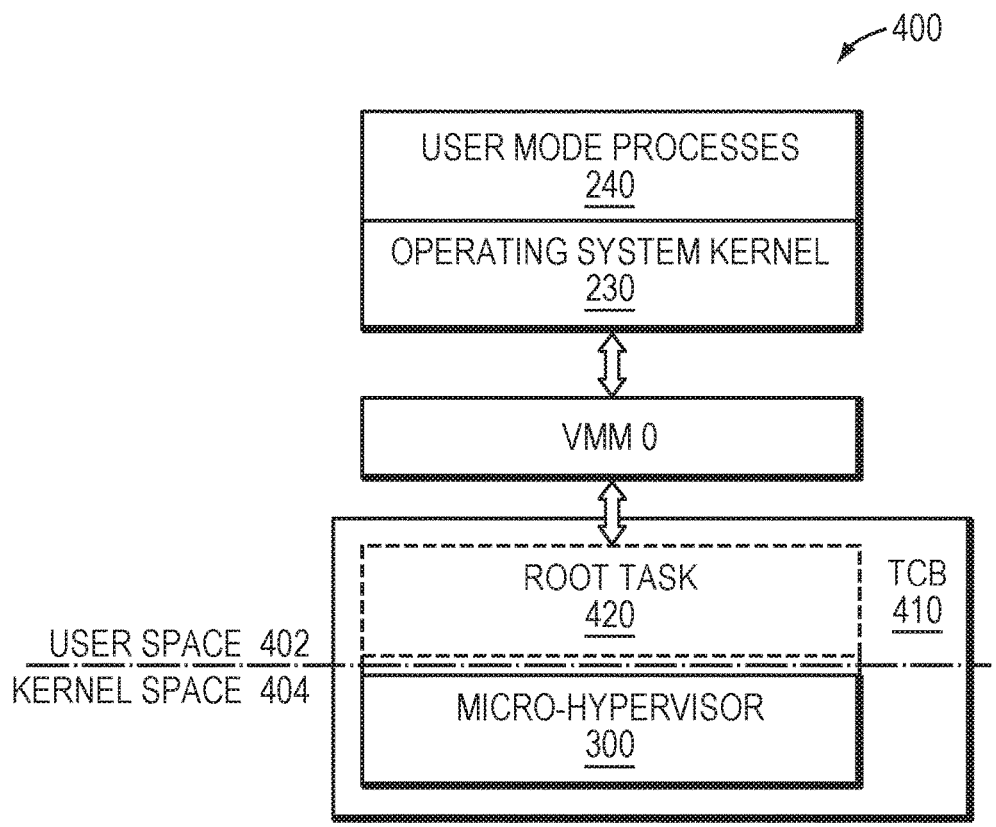
FIG. 4 is a block diagram of a micro-virtualization architecture including a trusted computing base (TCB) that may be advantageously used with one or more embodiments described herein.

In an embodiment, the micro-hypervisor may be stored in memory as a module of a trusted computing base that also includes a root task module (hereinafter "root task") configured to cooperate with the micro-hypervisor to create (i.e., load) one or more other modules executing on the CPU of the node. FIG. 4 is a block diagram of a micro-virtualization architecture 400 including the trusted computing base (TCB) 410 that may be advantageously used with one or more embodiments described herein. Illustratively, the micro-virtualization architecture 400 may organize the memory 220 as a user space 402 and a kernel space 404. The micro-hypervisor 300 may be disposed as a relatively small code base (e.g., approximately 9000-10,000 lines of code) that underlies the operating system kernel 230 and executes in the kernel space 404 of the architecture 400 to control access to the kernel resources for any operating system process (kernel or user mode). Notably, the micro-hypervisor 300 executes at the highest privilege level of the hardware (CPU) thereby to virtualize access to the kernel resources of the node in a light-weight manner.

The user mode processes 240 and operating system kernel 230 may execute in the user space 402 of the micro-virtualization architecture 400, although it will be understood to those skilled in the art that one or more of the user mode processes may execute in another address space defined by the operating system kernel. Illustratively, the operating system kernel 230 may execute under control of the micro-hypervisor 300 at a privilege level (i.e., a logical privilege level) lower than a highest privilege level of the micro-hypervisor, but at a higher CPU privilege level than that of the user mode processes 240. In addition, VMM 0 and its spawned VMs (e.g., VM and micro-VM N) may execute in user space 402 of the architecture 400 as processes having a relatively larger code base (e.g., approximately 20,000-30,000 lines of code) than the micro-hypervisor, primarily due to the instrumentation logic 350, 360. As a type 0 virtual machine monitor, VMM 0 (and its spawned VM and micro-VMs) may execute at the highest (logical) privilege level of the micro-hypervisor 300. That is, VMM 0 (and its spawned VM and micro-VMs) may operate under control of the micro-hypervisor at the highest micro-hypervisor privilege level, but may not directly operate at the highest CPU (hardware) privilege level.

In an embodiment, the root task 420 may be disposed as a relatively small code base (e.g., approximately 1000 lines of code) that overlays the micro-hypervisor 300 (i.e., underlies VMM 0) and executes in the user space 402 of the architecture 400. Through cooperation (e.g., communication) with the micro-hypervisor, the root task 420 may also initialize (i.e., initially configure) the loaded modules executing in the user space 402. To that end, the root task 420 may execute at the highest (absolute) privilege level of the micro-hypervisor. Illustratively, the root task 420 may communicate with the micro-hypervisor 300 to manage, e.g., allocate, the kernel resources to the loaded user space modules. In this context, allocation of the kernel resources may include creation of, e.g., maximal capabilities that specify an extent to which each module (such as, e.g., VMM 0) may access its allocated resource(s). For example, the root task 420 may communicate with the micro-hypervisor 300 through instructions to allocate memory and/or CPU resource(s) to VMM 0, and to create capabilities that specify maximal permissions allocated to VMM 0 when attempting to access (use) the resource(s). Such instructions may be provided over the privileged interface 310 embodied as one or more hyper-calls. Notably, the root task 420 is the only (software or hardware) entity that can instruct the micro-hypervisor with respect to initial configuration of such resources.

In an embodiment, the root task 420 may be implemented as a "non-long lived" process that terminates after creation and initial configuration of the user space processes (modules). The non-long lived nature of the root task is depicted by dash lining of the root task 420 in FIG. 4. Illustratively, the root task 420 is the first user space process to boot (appear) during power-up and initialization of the node, including loading and initial configuration of the user space modules and their associated capabilities; the root task then terminates (disappears). The root task 420 may thereafter be re-instantiated (reappear) during a reboot process, which may be invoked in response to an administrative task, e.g. update of VMM 0. Notably, the root task 420 may only appear and operate on the node in response to a (re)boot process, thereby enhancing security of the TCB 410 by restricting the ability to (re)initialize the micro-hypervisor 300 after deployment on the node 200.

As a trusted module of the TCB, the micro-hypervisor 300 is illustratively configured to enforce a security policy of the TCB that, e.g., prevents (obviates) alteration or corruption of a state related to security of the micro-hypervisor by a module (e.g., software entity) of or external to an environment in which the micro-hypervisor 300 operates, i.e., the TCB 410. For example, an exemplary security policy may provide, "modules of the TCB shall be immutable," which may be implemented as a security property of the micro-hypervisor, an example of which is no module of the TCB modifies a state related to security of the micro-hypervisor without authorization. In an embodiment, the security policy of the TCB 410 may be implemented by a plurality of security properties of the micro-hypervisor 300. That is, the exemplary security policy may be also implemented (i.e., enforced) by another security property of the micro-hypervisor, another example of which is no module external to the TCB modifies a state related to security of the micro-hypervisor without authorization. As such, one or more security properties of the micro-hypervisor may operate concurrently to enforce the security policy of the TCB.

Illustratively, the micro-hypervisor 300 may manifest (i.e., demonstrate) the security property in a manner that enforces the security policy. Accordingly, verification of the micro-hypervisor to demonstrate the security property necessarily enforces the security policy, i.e., the micro-hypervisor 300 may be trusted by demonstrating the security property. Trusted (or trustedness) may therefore denote a predetermined level of confidence that the micro-hypervisor demonstrates the security property (i.e., the security property is a property of the micro-hypervisor). It should be noted that trustedness may be extended to other security properties of the micro-hypervisor, as appropriate. Furthermore, trustedness may denote a predetermined level of confidence that is appropriate for a particular use or deployment of the micro-hypervisor 300 (and TCB 410). The predetermined level of confidence, in turn, is based on an assurance (i.e., grounds) that the micro-hypervisor demonstrates the security property. Therefore, manifestation denotes a demonstrated implementation that assurance is provided regarding the implementation based on an evaluation assurance level, i.e., the more extensive the evaluation, the greater the assurance level. Evaluation assurance levels for security are well-known and described in Common Criteria for Information Technology Security Evaluation Part 3: Security Assurance Components, September 2012, Ver 3.1 (CCMB-2012-09-003). For example, evaluation assurance level 7 includes formal design verification and test as confirmed independently (i.e., by a third party).

Figure 5:
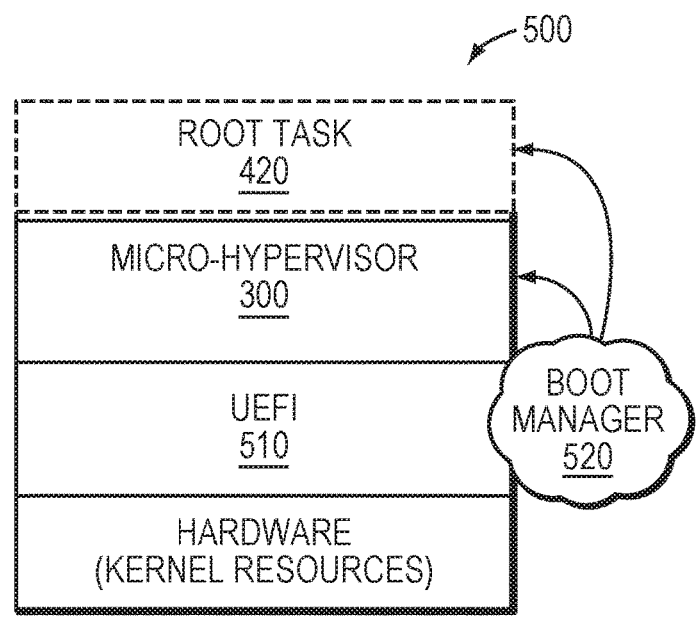
FIG. 5 is a block diagram illustrating a chain of loading that may be advantageously used with one or more embodiments described herein.

In an embodiment, trustedness may include both (i) manifestation of the security property in the micro-hypervisor code (e.g., no inherent security flaw) as a static attribute, as well as (ii) manifestation of the security property while the code executes on the CPU (e.g., no alteration by an exploit) as a dynamic attribute. That is, trustedness may include manifestation of the security property as both static and dynamic attributes. As such, secure loading of trusted code contributes to overall trustedness, i.e., a predetermined level of confidence that the security property manifests in the micro-hypervisor 300 as deployed on the node. To support (and maintain) such trustedness, a chain of loading may be configured to securely launch the micro-hypervisor 300 as a first software entity loaded into memory 220 of node 200 during a boot process. FIG. 5 is a block diagram illustrating a chain of loading 500 that may be advantageously used with one or more embodiments described herein. Illustratively, a unified extensible firmware interface (UEFI 510) implementation (i.e., a Basic Input Output System, BIOS) may be extended to provide the chain of loading 500 to securely launch the micro-hypervisor 300 for deployment on the node. After loading the micro-hypervisor 300, the UEFI 510 may load the root task 420 of the TCB 410 prior to loading any other software entity, such as VMM 0 or the operating system kernel 230. The chain of loading 500 provided by the UEFI 510 may be further configured to authenticate the micro-hypervisor code prior to launching. It should be noted that the UEFI is stored in firmware and, thus, is not to be construed as the first software entity loaded during a boot process.

In an embodiment, loading of the micro-hypervisor 300 and root task 420 is performed by a UEFI loader, e.g., boot manager 520, in accordance with an "early loading" procedure. The early loading procedure is illustratively provided by the hardware platform, e.g., including the UEFI 510, as part of an initialization (power-up) and boot sequence. Broadly stated, a power on self-test (POST) procedure may be invoked and executed by the CPU 212 in response to powering-on of the node 200. Firmware of the UEFI 510 may then be loaded to initialize the hardware (including the kernel resources) of the node prior to booting of software program code, such as UEFI application programs. The firmware may then invoke the boot manager 520 to launch one or more of the UEFI application programs, e.g., from a storage device. Illustratively, the first UEFI application program launched by the boot manager is the micro-hypervisor 300 and the second UEFI application program launched immediately thereafter is the root task 420. The boot manager 520 may thus control the boot order and location of the micro-hypervisor 300 and root task 420 by, e.g., configuring the memory 220, constructing any necessary data structures (such as system table 260 for run-time and boot services) and configuring interrupt interfaces (e.g., storage devices).

Enhanced Verification

In an embodiment, trustedness of the micro-hypervisor 300 may be verified by subjecting the TCB 410 (i.e., the micro-hypervisor and root task) to enhanced verification analysis prior to deployment on the node. Note that the enhanced verification technique may also be applied to one or more modules included within the TCB as described further herein. Illustratively, the enhanced verification is performed in a computing environment (e.g., including processing and memory resources to accommodate execution of the software programs constituting the enhanced verification system described herein) that are separate and apart from the network environment deploying the trusted micro-hypervisor. Enhanced verification may be configured to ensure that the TCB 410 conforms to an operational model (e.g., constructed with key elements of the code base) with an appropriate level of confidence over an appropriate range of activity (e.g., inputs, outputs, and operational states). The operational model may be a sufficient specification of the behavior of the micro-hypervisor as modeled in a typed Lambda calculus, e.g., a pure functional programming language such as Haskell and OCaml. For example, the operational model may include sufficient detail to specify the hyper-calls (e.g., how hyper-call parameters are encoded in binary form) and to describe, e.g., in abstract logical terms, the effect of each hyper-call. It should be noted that the operational model is not an implementation of the micro-hypervisor (e.g., 'C++' source code), but rather a functional specification of desired effects (e.g., effects of each hyper-call) on the behavior of the micro-hypervisor. The operational model may be rendered executable by generating suitable functional programming language code (e.g., Haskell and OCaml) from a theorem prover (e.g., Coq or Isabelle). For example, a Haskell to 'C' translator may be used to generate C or C++ code, which is then compiled to machine code. Alternatively, machine code may be generated directly (i.e., compiled) from the functional programming language code, e.g., OCaml. In addition, interpreted functional programming languages (e.g., Haskell bytecodes) also may be used. It should be noted that the executable operational model may be used for automated consistency verification (e.g., compliance testing) between the operational model and the TCB, as described herein.

The theorem prover may provide an environment to verify the security property as a theorem with respect to (against) the operational model (i.e., logically prove the security property in a model domain). Illustratively, the security property may be entered into the theorem prover as a theorem (e.g., trustedness of the micro-hypervisor) to be verified against the operational model using, e.g., Hoare logic. The theorem prover may then be used to determine (e.g., prove) whether the operational model demonstrates the security property (as both static and dynamic attributes) and, thus, the security policy. In response, the operational model may be modified when the security property is not demonstrated. For example, failure to demonstrate the security property may be static (e.g., a coding error) or dynamic (e.g., deficient of protection, such as insufficient checking of invalid hyper-call parameters). In other words, the operational model (i.e., functional specification) of the micro-hypervisor 300 may be iteratively modified until the security property is demonstrated. In this manner assurance is provided that the TCB (e.g., micro-hypervisor) demonstrates the security property, thus yielding the predetermined level of confidence that the TCB 410 manifests the security policy. Notably, assurance of the consistency between the operational model and the code base of the TCB is also used to achieve a sufficient level of confidence (i.e., trustedness) that the TCB demonstrates the security policy. Therefore, the operational model may serve as a convenient and efficient proxy to verify both correctness and manifestation of the security property.

Illustratively, formal verification of the TCB involves: (i) mathematical and logical verification (e.g., by humans) of the operational model against the security property (i.e., manifestation of the security property); (ii) development of the code base (e.g., by humans) to comply with the operational model (e.g., iteratively modify the code base to achieve manifestation of the security property); (iii) comprehensive compliance testing (preferably by automation) to ensure consistency between the code base and the operational model; and (iv) verification of the hardware/firmware of the node. For example, a 10,000 lines of code software stack (e.g., TCB 410 including the micro-hypervisor 300 and root task 420) may require as many as hundreds of man years of effort to perform the unwieldy and complex human intensive task of formal verification (without the hardware verification indicated in (iv) above) on the TCB, where a majority of such effort would be directed to the assurance of consistency between the operational model and the TCB. Such verification may require services of highly-educated and skilled software developers, e.g., having PhDs and post doctorate degrees. In sum, the assurance of consistency between the operational model and the TCB may be lengthy and complex. Therefore, it is desirable to provide an efficient method for assuring consistency between the operational model and the TCB (i.e., as indicated in (iii) above) based on a prescribed level of confidence, i.e., a predetermined level of confidence sufficient to assure trustedness.

As noted, trustedness may be defined in terms of the predetermined level of confidence that is appropriate for a particular deployment of the micro-hypervisor. Such a level of confidence may be quantified based on the operational model. Indeed, a definition of trustedness may be rooted in commercial value of the micro-hypervisor. That is, a micro-hypervisor with a higher level of confidence with respect to manifesting the security property than that of another virtualization system has a greater commercial value. Approaching a 100% level of (i.e., complete) confidence requires formal verification (including comprehensive compliance testing) of the entire TCB, which may be too extensive and, thus, impractical for many deployments. Therefore, a practical solution may mandate a predetermined level of confidence (e.g., not less than 90%) with associated risks (e.g., vulnerabilities) that is appropriate for a particular deployment. It should be noted that the predetermined level of confidence with respect to the security property may be prescribed with respect to code that has been proven correct, i.e., code that has been compliance tested and determined to be sufficiently correct for product commercialization. As such, the predetermined level of confidence (i.e., assurance) in trustedness may be increased (and the associated risk reduced) with additional compliance testing. That is, assurance in trustedness may monotonically increase with an amount of compliance testing.

Secure Communication Using a Verified Virtual TPM

The embodiments herein are directed to a technique for providing secure communication between nodes of a network environment using a verified virtual trusted platform module (TPM) of each node. The verified virtual TPM is a software module that illustratively emulates a hardware TPM device to provide software key management of cryptographic keys used to provide the secure communication over a computer network of the network environment. In effect, the verified virtual TPM provides trustedness comparable to that of a hardware TPM device by enforcing a security policy similar to that provided by the hardware TPM device, e.g., "the TPM device shall be immutable." Accordingly, the verified virtual TPM simulates a hardware TPM to a degree needed to enforce the security policy, i.e., the verified virtual TPM emulates the trustedness of the hardware TPM. A detailed description of TPM modules may be found in the Trusted Platform Module Library, Family 2.0, Revision 01.16, October 2014 available from the Trusted Computing Group industry standards group (http://www.trustedcomputinggroup.org) and also published by the International Standards Organization as ISO/IEC 11889-1: 2015. Illustratively, the functionality (i.e., code) of the verified virtual TPM is directed to generating and storing one or more cryptographic keys used for digital signature verification as well as encryption/decryption, and to execute data encryption/decryption algorithms and signature verification operations. Upon initialization, the verified virtual TPM may generate and secretly maintain a unique cryptographic key, e.g., a private key, that always resides in the verified virtual TPM. The verified virtual TPM code may thereafter employ the private key to verify a piece of data (i.e., verify that the data is properly signed) and/or encrypt/decrypt data. As such, the verified virtual TPM avoids hardware-based requirements, such as a TPM hardware device having a memory storing cryptographic keys and soldered to a platform.

To that end, the technique provides a "core" virtual TPM interface (i.e., API) to enable access to software key management services relating to the generation and storage of the cryptographic keys. The software key management services may be accessed to perform encryption and/or decryption of information, as well as signature and/or verification of the information exchanged over the network with a user (peer). The peer may access the services provided by the core virtual TPM interface through the use of function calls embodied as application programming interfaces (APIs) that comply with the hardware TPM device. For example, the peer may request that the verified virtual TPM generate a cryptographic key (e.g., in a portion of memory 220 configured as a secure memory 650 dedicated to the virtual TPM, wherein the term "secure memory" denotes safeguarding of the contents of the secure memory by the verified virtual TPM through enforcement of the security policy) for use by the peer to encrypt and sign data. In response, the verified virtual TPM may generate a public-private key pair, wherein the private key is owned by (known only to) the verified virtual TPM and the public key is provided to and used by the peer external to the verified virtual TPM to encrypt and sign the data. Note that only the verified virtual TPM can verify (using the private key) the encrypted data and signature provided by the peer (using the public key).

To maintain confidentiality of information (such as, e.g., the cryptographic keys) served by the verified virtual TPM, the peer may provide a password to the verified virtual TPM, wherein the password is used to decrypt the information (e.g., one or more cryptographic keys) stored in the secure memory of the verified virtual TPM and served by the verified virtual TPM at a host mode level of the virtualization architecture (e.g., the micro-hypervisor) outside of the guest operating system. For example, the verified virtual TPM may generate and store the public-private key pair for use with the peer to provide secure communication of information exchanged with the peer. The private key is illustratively stored in the secure memory 650 of the verified virtual TPM for use in, e.g., decrypting data. The public key is illustratively also stored in the secure memory 650 of the verified virtual TPM for use by the peer to, e.g., encrypt and sign data. The password provided by the peer may thus be used to protect (i.e., password protect) the storage location (i.e., of secure memory 650) of the verified virtual TPM for storing the virtual TPM keys (e.g., public and private keys).

Figure 6:
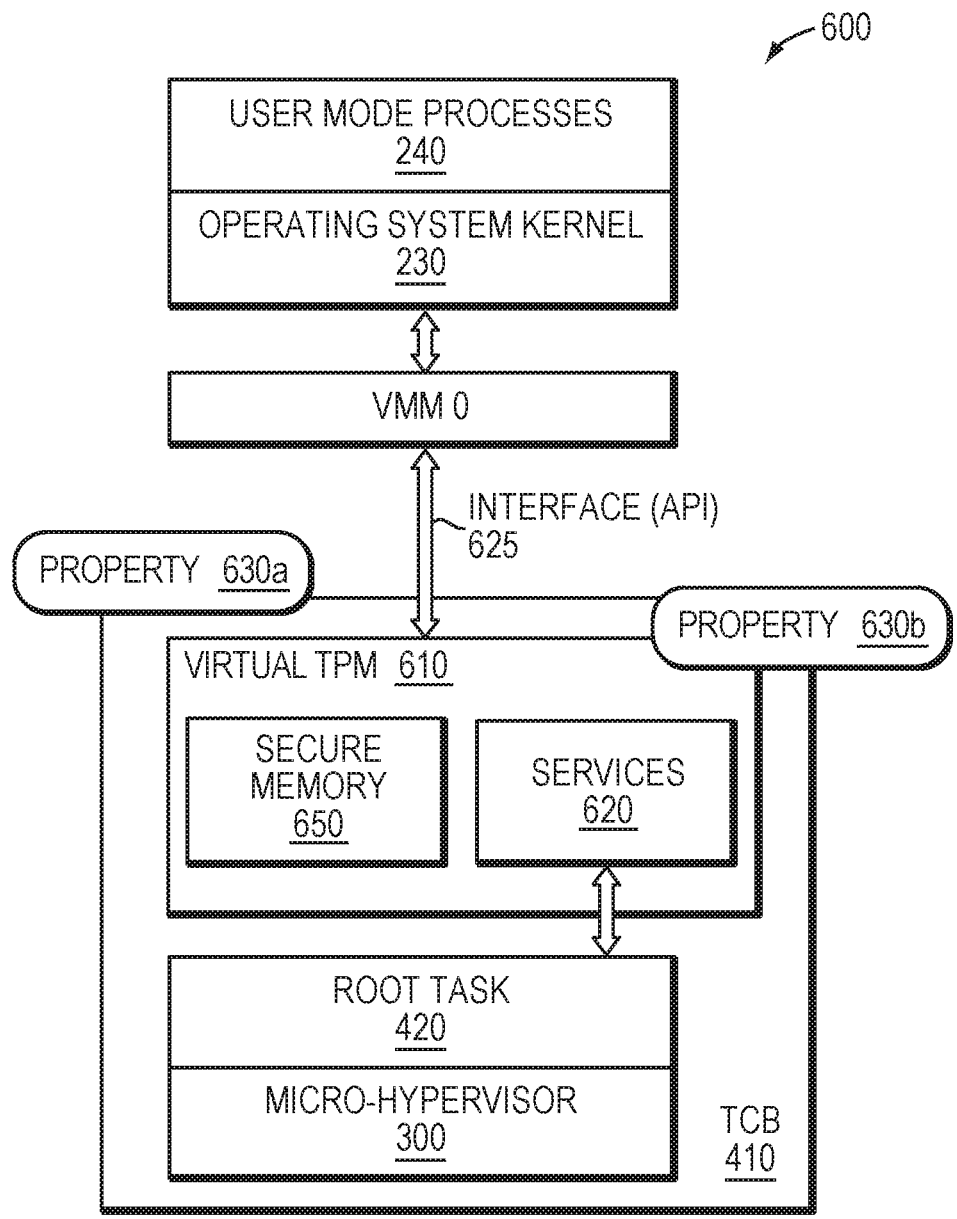
FIG. 6 is a block diagram illustrating a technique for providing secure communication between nodes of a network environment using a verified virtual trusted platform module (TPM) of each node.

FIG. 6 is a block diagram illustrating a technique for providing secure communication between nodes of a network environment using a verified virtual trusted platform module (TPM) of each node. In an embodiment, the verified virtual TPM 610 may be a module of the TCB 410 that includes the micro-hypervisor 300 and root task module 420 of a virtualization system configured to facilitate run-time security analysis, including exploit and malware detection as well as threat intelligence collection, associated with one or more processes of a guest operating system 230 executing on the node. As a trusted module of the TCB, the verified virtual TPM 610 may be configured to enforce a security policy of the TCB that, e.g., prevents alteration of a state related to security of the verified virtual TPM by a module (e.g., software entity) of or external to an environment in which the verified virtual TPM operates, i.e., the TCB. For example, an exemplary security policy may provide, "modules of the TCB shall be immutable," which may be implemented as a security property 630b of the verified virtual TPM, an example of which is no module external to the verified virtual TPM can read the contents of the secure memory 650 for the verified virtual TPM, similar to immutability of a hardware TPM device that enforces a corresponding security policy (i.e., "the TPM device shall be immutable"). Accordingly, the private key owned by the verified virtual TPM is not accessible (read) by software external to the verified virtual TPM. Such inaccessibility is guaranteed as part of the TCB and the inability to tamper with the verified virtual TPM. A process of the guest operating system may request that the verified virtual TPM verify and/or decrypt a piece of encrypted data.

Illustratively, the verified virtual TPM may manifest (i.e., demonstrate) the security property 630b in a manner that enforces the security policy. Verification of the virtual TPM to demonstrate the security property necessarily enforces the security policy, i.e., the virtual TPM may be trusted by demonstrating the security property and thereby transform that module into a verified virtual TPM. As used herein, trusted (or trustedness) denotes a predetermined level of confidence that the security property is demonstrated by the verified virtual TPM. The predetermined level of confidence, in turn, is based on an assurance (i.e., grounds) that the verified virtual TPM demonstrates the security property. Therefore, manifestation denotes a demonstrated implementation that assurance is provided regarding the implementation based on an evaluation assurance level, i.e., the more extensive the evaluation, the greater the assurance level. Notably, trustedness of the virtual TPM may include verification of one or more additional properties 630a of the other components (e.g., micro-hypervisor) of the TCB. Moreover, the additional properties 630a may or may not be security related.

In an embodiment, the verified virtual TPM is a lightweight module, although a fully compliant TPM interface 625 providing TPM services 620 (i.e., compliant TPM interface and services as defined in the aforementioned TPM specification) may be furnished. For example, a Window's based personal computer (PC) having a guest operating system that supports disk encryption may rely on the fully compliant TPM interface and services for trusted disk encryption using the TPM hardware device provided with the PC. According to the technique, APIs of the verified virtual TMP interface 625 may be exposed to simulate the services of a "real" hardware-based TMP device that is just as immune to compromise (e.g., impervious to unauthorized access to contents of the memory) as a real TPM hardware device. Providing APIs in compliance with the TPM interface and services enables use of the verified virtual TPM instead of the hardware TPM.

In an embodiment, trustedness of the virtual TPM may be verified by subjecting the TCB (i.e., having the virtual TPM) to enhanced verification analysis prior to deployment on the node, so as to transform the virtual TPM into a verified virtual TPM. Enhanced verification may be configured to ensure that the TCB conforms to an operational model with an appropriate level of confidence over an appropriate range of activity (e.g., inputs, outputs, and operational states). An example of enhanced verification is described in U.S. Patent Publication No. 2016/0004869 A1, published Jan. 7, 2016 and titled, Verification of Trusted Threat-Aware Microvisor, by Ismael et al. The operational model may then be configured to analyze conformance of the virtual TPM to the security property, i.e., to determine whether the virtual TPM demonstrates the security property. A combination of conformance by the virtual TPM to the operational model and to the security property provides assurance (i.e., grounds) for the level of confidence and, thus, verifies trustedness. For example, trustedness (i.e., a predetermined level of confidence in manifestation of the security property) of the virtual TPM may be verified (i.e., confidence elevated) by demonstrating that an instruction issued by a module external to the TCB and having one or more arguments configured to alter an expected behavior or state of the virtual TPM related to the security property results in a violation (i.e., generation of a capability violation) such that the instruction is rejected (reply with error code) or ignored and prevented from execution by the micro-hypervisor.

Figure 7:
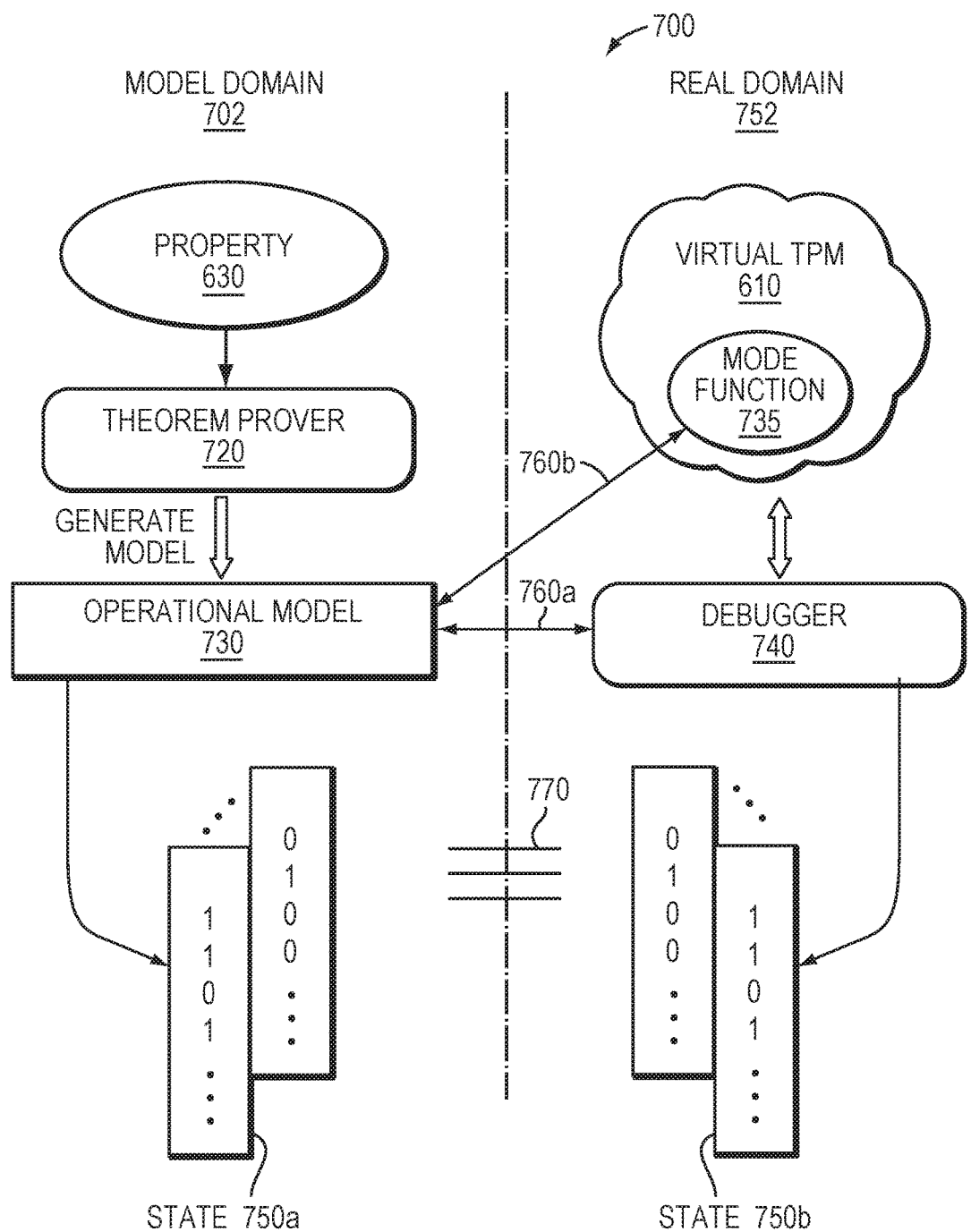
FIG. 7 is a block diagram of an enhanced verification arrangement that may be advantageously used with one or more embodiments described herein.

In an embodiment, the verified virtual TPM (and the TCB) may be configured to enable rapid compliance testing in accordance with an enhanced verification analysis that dramatically reduces the man years required to achieve near formal (i.e., greater than 90% confidence) verification of the virtual TPM (or TCB). The enhanced verification analysis may be performed in a computing environment separate and apart from the network environment deploying the trusted micro-hypervisor. FIG. 7 is a block diagram of an enhanced verification arrangement that may be advantageously used with one or more embodiments described herein. As applied to the virtual TPM, the enhanced verification arrangement 700 may include a model domain 702 which provides the ability to verify (i.e., logically prove) a property 630 of the virtual TPM against the operational model 730. The verification arrangement 700 may also include a real domain 752 that executes the virtual TPM as the actual object (i.e., binary code) sought to be verified, e.g., assured of trustedness. Verification (e.g., assurance of trustedness) is provided when (i) the property 630 is demonstrated within the model domain 702 and (ii) the real domain 752 sufficiently conforms to the model domain 702. Note that assurance of trustedness is provided when property 630 is security related. Note also that verification of the virtual TPM may include verifying the one or more properties 630 of the other components of the TCB, which may be security related and non-security related.

The enhanced verification arrangement 700 may further include a "mode" function 735 of the virtual TPM that captures a state 750b of the virtual TPM to ensure consistency with a corresponding state 750a of the operational model 730. Illustratively, the mode function 735 may be software code (i.e., a state descriptor) configured to capture (e.g., via a dump operation) the state 750b of the virtual TPM (e.g., at a point in time) and to express that state in a manner that can be compared with extracted state 750a from the operational model 730. Illustratively, the mode function implements a function to provide a view or recording of the state (e.g., dump state operation), which dumps the state 750b of the virtual TPM after a number of instructions of the virtual TPM have executed. A checkpoint communication 760a between a debugger 740 (e.g., a control module) in the real domain 752 and the operational model 730 may be used to initiate capture of the states 750a,b respectively for comparison. Alternatively, a checkpoint communication 760b between the operational model 730 in the model domain 702 and the mode function 735 of the virtual TPM in the real domain 752 may be used to initiate capture of the states 750a,b respectively for comparison. The checkpoint and state comparison may occur automatically (i.e., without human intervention) thereby to reduce an otherwise labor intensive process. In an embodiment, the operational model 730 may be further configured to analyze conformance to the property 630. Such conformance between the operational model 730 and the virtual TPM may be assured or verified (i.e., to the predetermined level of confidence) when a sufficient number of states (related to security) match between the virtual TPM and the operational model. In other words, conformance to the property 630 is verified, e.g., for the predetermined level of confidence, when there is sufficient test coverage between the model domain 702 and the real domain 752.

For example, trustedness (i.e., a predetermined level of confidence in manifestation of a security related property) of the virtual TPM may be verified (i.e., confidence elevated)

by demonstrating that an instruction issued by a module (e.g., VMM 0) external to the TCB and having one or more arguments configured to alter an expected behavior or state of the virtual TPM related to the property results in a violation (i.e., generation of an error) such that the instruction is rejected (reply with error code) or ignored and prevented from execution by the micro-hypervisor. To that end, binary code of the virtual TPM may be tested to execute an input (e.g., an operation manifested as a hyper-call issued by VMM 0 to invoke a service) with a resulting output (e.g., denial of services manifested as an error) and an associated operational state 750b. Illustratively, the operational state may be expressed as a virtual TPM dump object provided by the state descriptor. The operational model 730 may be similarly tested to execute the inputs with resulting outputs and associated operational states 750a (e.g., expressed as model dump objects). The virtual TPM and model dump objects may then be compared, e.g., using conventional software testing methodologies that include an automated testing environment to verify consistency. Illustratively, such automated, on-demand state-based consistency verification (e.g., compliance testing) between the operational model 730 and the virtual TPM enables comparison 770 of respective operational states so as to verify that the virtual TPM demonstrates the property 630.

Figure 8:
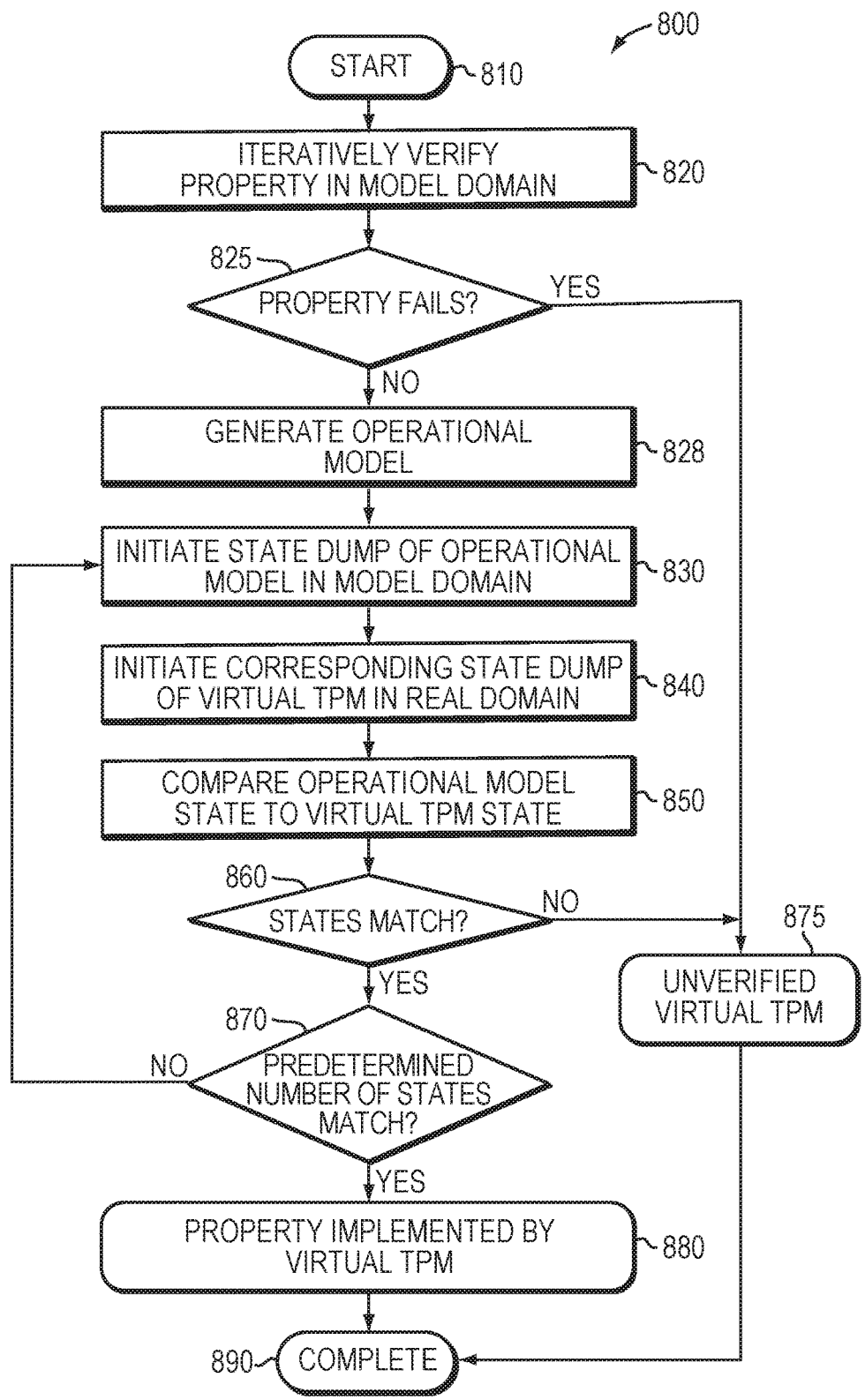
FIG. 8 is an example procedure for enhanced verification that may be advantageously used with one or more embodiments described herein.

FIG. 8 is an example procedure for enhanced verification that may be advantageously used with one or more embodiments described herein. The procedure 800 starts at step 810 and continues to step 820 where the security property is iteratively verified in the model domain by the theorem prover (i.e., logical verification that the operational model manifests the property). At step 825, a determination is made as to whether the property fails. If so, the virtual TPM is deemed unverified (e.g., untrusted) at step 875 and the procedure completes at step 890. However, if the property does not fail (i.e., the operational model progresses in manifesting the property), the operational model may be generated from the theorem prover at step 828 to render an executable operational model (e.g., a binary compiled from generated OCaml code, or Haskell bytes-codes).

A state dump of the operational model (i.e., the operational model executable) is initiated in the model domain at step 830 and, at step 840, a corresponding state dump of the virtual TPM is initiated in the real domain. At step 850, the state dumps of the operational model and virtual TPM are compared and, at step 860, a determination is made as to whether the states match. If not, the virtual TPM is deemed unverified at step 875 and the procedure completes at step 890. However, if the states match, then a determination is made (step 870) as to whether a predetermined number of states (related to the property) have been found to match. If not, the procedure returns to step 830 where a state (i.e., a next state) dump of the operational model iteratively continues. If the predetermined number of states have been found to match, then the predetermined number of matched states correspond to a predetermined level of confidence that the property is implemented by the virtual TPM (step 880), thereby rendering the virtual TPM verified (e.g., a trusted virtual TPM). The procedure then completes at step 890.

Support of the fully compliant TPM interface and services may be difficult due to complexity of the code requiring verification. As such, the technique described herein may divide the interface into virtual TPM "core" and non-core interface portions, wherein the core virtual TPM portion implements a verified subset of the fully compliant TPM interface and services. Illustratively, the subset of the TPM interface and services includes functions for authenticated access to secure memory. The remaining non-core portion of the fully compliant (heavyweight) virtual TPM interface and services may include complex functionality, such as the encryption algorithm, and may be embodied as one or more separate modules (i.e., not included in the TCB) that use, e.g., an open-source TPM library, to communicate with the verified core virtual TPM portion. Accordingly, the core virtual TPM may be formally verified for the security property, e.g., "components external to the TCB/virtual TPM cannot read the contents of secure memory for the virtual TPM"; whereas the non-core portion of fully compliant virtual TPM interface and services need not be verified. Specifically, the fully compliant (i.e., heavyweight) virtual TPM interface may be apportioned along defined interface boundaries to avoid having to verify the non-core portion of the fully compliant virtual TPM interface. Illustratively, a first set of modules (included in the non-core portion of the virtual TPM) that includes a TPM library interface (e.g., as defined in the above-mentioned ISO/IEC 11889-1:2015 standard) is not formally verified and a second set of modules (included in the core virtual TPM portion) is verified for the security property. In that case, the technique verifies only the core virtual TPM interface that includes function calls such as, e.g., relating to management and storage of the cryptographic keys (e.g., less than 5000 lines of code), and security properties such as "no component external to the virtual TPM can read the secure memory of the virtual TPM".

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for establishing secure communications over a network in accordance with verifiable secure software key management, comprising:

verifying a virtual trusted platform module (TPM) being software that emulates operations of a hardware TPM, the virtual TPM is configured to manifest a security property that enforces a security policy preventing alteration of content within a secure memory by software external to the virtual TPM, wherein the security property is manifested by subjecting code including at least a first portion of the virtual TPM to enhanced verification analyses to confirm that (i) the code conforms to an operational model including key elements of the code and (ii) the virtual TPM demonstrates the security property; and providing the virtual TPM for deployment within a node, wherein the virtual TPM being configured to generate one or more cryptographic keys on the node, store the one or more cryptographic keys within the secure memory, and safeguard content of the secure memory including the one or more cryptographic keys for use in establishing secure communications over the network.

2. The method of claim 1 wherein the virtual TPM demo security policy provides for the virtual TPM to be immutable.

3. The method of claim 1 wherein the virtual TPM demonstrates the security property by at least verifying that at least a predetermined level of confidence exists based on a comparison of at least states associated with at least the first portion of the virtual TPM to states produced by the operational model.

4. The method of claim 3 wherein the comparison of at least the states associated with at least the first portion of the virtual TPM to the states produced by the operational model comprises:

generating an executable of the operational model;
initiating a state dump of the operational model;
initiating a corresponding state dump of the first portion of the virtual TPM;
iteratively comparing the states of the executable operational model and the first portion of the virtual TPM; and
continuing iterative comparison of the states of the executable operational model and the first portion of the virtual TPM until a predetermined number of states match, wherein the predetermined number of matched states form a sufficient test coverage between the executable operational model and the first portion of the virtual TPM.

5. The method of claim 1 wherein the virtual TPM includes the first portion being a verified subset of a fully compliant TPM interface and a second portion implementing a remaining subset of the fully compliant TPM interface, and wherein the second portion is not verified for the security property.

6. The method of claim 1 wherein the security property is verified by proving the security property on a theorem prover.

7. The method of claim 1 wherein the code includes a trusted code base and the virtual TPM corresponds to a software module of the trusted code base.

8. The method claim 1 wherein the code conforms to the operational model with an appropriate level of confidence over an appropriate range of activities including inputs, outputs and operational states.

9. The method of claim 1 wherein storing the cryptographic key in the secure memory comprises protecting the cryptographic key stored in the secure memory with a password provided by a peer.

10. The method of claim 7 wherein a combination of conformance by the virtual TPM to the operational model and to the security property provides assurances for a level of confidence that verifies trustedness to yield the virtual TPM.

11. The method of claim 10 wherein the trustedness of the virtual TPM is set by demonstrating that an instruction issued by a module external to the code and having one or more arguments configured to alter an expected behavior or state of the virtual TPM related to the security property results in a violation in which the instruction is rejected or ignored and prevented from execution.

12. The method of claim 1 wherein the virtual TPM includes the first portion being a verified subset of the code functioning to verify access to the secure memory and a second portion being software module, separate from the code and non- verified, for handling encrypting of data for the virtual TPM.

13. A system comprising:

a central processing unit (CPU) adapted to execute a verified virtual trusted platform module (TPM) being software that emulates operations of a hardware TPM;

a memory configured to store code operating as a trusted computing base (TCB), and the virtual TPM being a part of the TCB; and a secure memory configured from a portion of the memory by the TCB, wherein the virtual TPM having been configured to manifest a security property that enforces a security policy preventing alteration of content within the secure memory by software external to the virtual TPM, the security property is manifested by subjecting at least a first portion of the virtual TPM to enhanced verification analyses to confirm that (i) the code conforms to an operational model including key elements of the TCB and (ii) the virtual TPM demonstrates the security property.

14. The system of claim 12 wherein the virtual TPM operates as a verifiable secure software key management system for controlling access one or more cryptographic keys stored within the secure memory.

15. The system of claim 12 wherein virtual TPM enables secure communication between a node including the virtual TPM and a TPM of a second node, different than the node, over a network environment.

16. The system of claim 15 wherein the security property is verified with a predetermined level of confidence based on a comparison of at least states of a trusted portion of the virtual TPM to states produced by an operational model and the comparison of at least states of the trusted portion of the virtual TPM to states produced by the operational model is conducted to verify the security property by at least:

generating an executable of the operational model;
initiating a state dump of the operational model;
initiating a corresponding state dump of the trusted portion of the virtual TPM;
iteratively comparing the states of the executable operational model and the trusted portion of the virtual TPM; and
continuing iterative comparison of the states of the executable operational model and the trusted portion of the virtual TPM until a predetermined number of states match, wherein the predetermined number of matched states form a sufficient test coverage between the executable operational model and the trusted portion of the virtual TPM.

17. The system of claim 13 wherein the virtual TPM includes the first portion being a first subset of code representing the virtual TPM with the security property verified with a predetermined level of confidence based on state comparisons between the first portion of the virtual TPM and an operational model and a second portion implementing a remaining subset of the code representing the virtual TPM.

18. The system of claim 15 wherein the virtual TPM is deployed within a node operating in the network.

19. The system of claim 15 wherein the security property is verified by proving the security property on a theorem prover.

20. The system of claim 16 wherein the executable operational model initiates on-demand the state dump of the operational model and the corresponding state dump of the trusted portion of the virtual TPM.

21. The system of claim 15 wherein the cryptographic key included in the secure memory is protected with a password provided by a peer having access to the second node.

22. A non-transitory computer readable medium including program instructions for execution on a processor of a node on a network, the program instructions when executed operable to:
  generate at least a cryptographic key using a verified virtual trusted platform module (TPM) being a portion of code that emulates a hardware TPM, wherein the virtual TPM manifesting a security property that enforces a security policy to prevent alteration of a state related to security of the virtual TPM by software external to the virtual TPM, wherein the security property is verified to a predetermined level of confidence based on a state comparison of at least states of a first portion of the virtual TPM to states produced by an operational model including key elements of the code and the virtual TPM safeguards contents of a secure memory accessible by the virtual TPM;
  store the cryptographic key in the secure memory; and
  communicate securely over the network with a peer using the cryptographic key.

23. The non-transitory computer readable medium of claim 22 wherein the security policy provides for the virtual TPM to be immutable.

24. The non-transitory computer readable medium of claim 22 wherein the virtual TPM demonstrates the security property by at least verifying that at least states associated with at least a predetermined level of confidence exists based on a comparison of at least states associated with at least the first portion of the virtual TPM to states produced by the operational model.

25. The non-transitory computer readable medium of claim 24 wherein the comparison of at least the states associated with at least the first portion of the virtual TPM to the states produced by the operational model comprises:
  generating an executable of the operational model;
  initiating a state dump of the operational model;
  initiating a corresponding state dump of the first portion of the virtual TPM;
  iteratively comparing the states of the executable operational model and the first portion of the virtual TPM; and
  continuing iterative comparison of the states of the executable operational model and the first portion of the virtual TPM until a predetermined number of states match, wherein the predetermined number of matched states form a sufficient test coverage between the executable operational model and the first portion of the virtual TPM.

26. The non-transitory computer readable medium of claim 22 wherein the virtual TPM includes the first portion being a verified subset of a fully compliant TPM interface and a second portion implementing a remaining subset of the fully compliant TPM interface, and wherein the second portion is not verified for the security property.

27. The non-transitory computer readable medium of claim 22 wherein the security property is verified by proving the security property on a theorem prover.

28. The non-transitory computer readable medium of claim 22 wherein the code includes a trusted code base and the virtual TPM corresponds to a software module of the trusted code base.

29. The non-transitory computer readable medium of claim 22 wherein the code conforms to the operational model with an appropriate level of confidence over an appropriate range of activities including inputs, outputs and operation states.

30. The non-transitory computer readable medium of claim 22 wherein storing the cryptographic key in the secure memory comprises protecting the cryptographic key stored in the secure memory with a password provided by a peer.

31. The non-transitory computer readable medium of claim 29 wherein a combination of conformance by the TPM to the operational model and to the security property provides assurances for a level of confidence that verifies trustedness to yield the virtual TPM.

* * * * *